United States Patent Office 3,414,510
Patented Dec. 3, 1968

3,414,510
METHOD FOR SELECTIVELY REMOVING CHROMATES
Alfred W. Oberhofer, Alsip, Ill., assignor to Nalco Chemical Company, Chicago, Ill., a corporation of Delaware
No Drawing. Filed Feb. 29, 1968, Ser. No. 709,182.
8 Claims. (Cl. 210—37)

ABSTRACT OF THE DISCLOSURE

Removal of chromate ions from water containing a large amount of total dissolved solids by contacting the water with an acidified weakly basic anion exchange resin, preferably in microporous form, to selectively remove chromates from the water.

BACKGROUND OF THE INVENTION

Inorganic chromates are frequently employed as corrosion inhibiting materials in industrial waters, particularly in circulating water systems for cooling towers. The chromates are sometimes used alone but frequently are employed in conjunction with molecularly dehydrated phosphates, the combination functioning as scale and corrosion inhibitors to protect metal conduits and other metallic surfaces with which the circulating water comes in contact.

Water being used as a cooling medium in industrial applications frequently is very high in dissolved solids, usually exceeding 1000 parts per million or so. When a cooling tower which has been treated with chromate corrosion inhibitors reaches a certain concentration level of dissolved solids, it is customary to blow it down by discharging a portion of the water and adding fresh make-up water having a lower dissolved solids content. A typical cooling water blow-down might contain, for example, 20 parts per million of a chromate salt and 1200 parts per million of other dissolved salts such as sodium chloride, calcium sulfate, magnesium nitrate, and the like.

When such waters are discharged into natural water courses or to sewage systems, the high chromate concentration may pose a problem because of local regulations covering the nature of effluents which can be discharged. The presence of the large dissolved solids content, however, makes it quite difficult to remove the chromate ions selectively while leaving the relatively innocuous salts for discharge.

DESCRIPTION OF THE PRIOR ART

Some attempts have been made to use ion exchange resins in the removal of chromate ions from waste waters containing high levels of total dissolved solids but not with complete success. In some cases, the resins have a distinct fouling tendency and some are not stable to oxidation. Furthermore, strongly basic anion exchange materials when used for this purpose do not have particularly high loading capacities nor high regeneration efficiencies.

SUMMARY OF THE INVENTION

The present invention makes use of weakly basic anion exchange resins under certain operating conditions for a selective removal of chromate ions from waters having high total dissolved solid contents. Specifically, it has been found that macroporous weakly basic anion exchange resins which have been at least partially acidified prior to use can selectively remove chromate ions from industrial waters having large amounts of total dissolved solids. The weakly basic resins have the advantage of providing higher loading capacities, are less subject to organic fouling, and have a high regeneration efficiency. The best results are obtained in the process of the present invention when the pH of the water being treated is adjusted to a value of from 3.0 to 5.0 before contacting the same with the resin, and preferably to a value of from 3.0 to 3.5.

DESCRIPTION OF THE PREFERRED EMBODIMENTS

The weak base anion exchange resins which provide the best results in the practice of the present invention are those which are macroporous, having pore diameters ranging from about 5 to 100 Angstroms or more. Chemically, these materials can be of different constitution, but should contain an intermediate amine as the exchange site. Particularly good results are obtained when the resin used is a mixture of secondary and tertiary amines, since these resins are considerably more stable to oxidation than are resins which have reaction sites consisting solely of primary and secondary amines.

The best resins found for this purpose are the polystyrene divinyl benzene amines which are prepared by nitration and subsequent reduction of styrene-divinyl benzene copolymers. Other materials which can be used in accordance with the present invention are the weak base anion exchange resins such as the amine derivatives of epichlorohydrin and polyvinylpyrrolidone.

Prior to contacting the water to be treated with the resin, the resin is acidified by treatment with a dilute mineral acid such as sulfuric acid or hydrochloric acid to at least partially convert the amine to its acid form. It is not always necessary that the amine be treated with stoichiometric amounts of acid sufficient to cause complete conversion to the acid form, but satisfactory results can be obtained using an amount of acid ranging from about 10% to 100% of the stoichiometric amount.

The treatment can be effected in the usual way by passing the water through a bed of particles of the weakly basic anion exchange resin.

To illustrate the beneficial effect of acidification of the resin, a test was made using 140 ml. of a weak base ion exchange resin (IRA–93, a polystyrene-divinyl benzene amine supplied by Rohm and Haas) in a one-half inch internal diameter column, with a forty-two inch bed height at flow rates up to 14,000 gallons per cubic foot. The following table illustrates the results obtained:

TABLE I

| Ionic form | Influent pH | Flow rate, g.p.m./cu. ft. | Capacity, lbs./cu. ft. | Average $CrO_4$ leakage, p.p.m. |
|---|---|---|---|---|
| $H_2SO_4$ | 3.5 | 2.0 | 5.9 | <0.1 |
| $H_2SO_4$ | 3.5 | 1.0 | 6.2 | <0.1 |
| $H_2SO_4$ | 4.5 | 1.0 | 4.9 | <0.1 |
| Free amine | 3.5 | 1.0 | 5.6 | 10 |

The water employed in the above test contained 1400 parts per million of total dissolved solids (calcium, magnesium, sodium, sulfate and chloride) plus 49 parts per million of chromate ion. The temperature of the influent was held between 75 and 85° F.

The resins can be regenerated by treatment with an alkali such as sodium hydroxide, potassium hydroxide, or ammonium hydroxide to remove the chromate ions.

After exhaustion, the column with a loading of 4.9 pounds chromate per cubic foot was regenerated with 560 ml. of 4% sodium hydroxide, amounting to a concentration of 10.3 pounds of sodium hydroxide per cubic foot of resin. This large excess of sodium hydroxide was used to assure a complete regeneration. Samples were taken periodically during the one hour contact of the sodium hydroxide with the resin. The total chromate eluted by the regenerant was 5.14 pounds per cubic foot. Of this, 96% was eluted by the first 420 ml. of regenerant.

As previously indicated, the best results are obtained using an influent pH of 3.0 to 5.0. However, the resins will remove chromate ions at lower pH values than 3.0 but the stability of the resin is significantly decreased at these pH values. The highest resin loading occurs at an influent pH of 3.5.

The reactions involved are believed to be represented by the following equations:

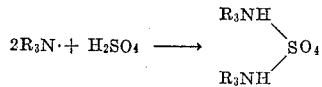

Chromate removal:

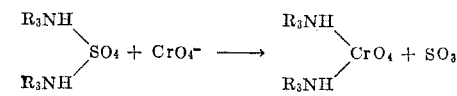

Regeneration with NaOH:

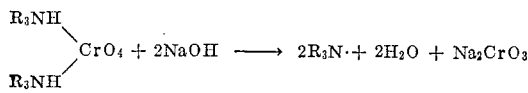

It should be evident that various modifications can be made to the described embodiments without departing from the scope of the present invention.

I claim as my invention:

1. The method of selectively removing chromate ions from water containing a large amount of total dissolved solids which comprises acidifying a weakly basic anion exchange resin and thereafter contacting said water with the acidified resin to cause selective removal of chromate ions from said water.

2. The method of claim 1 in which said anion exchange resin is in macroporous form.

3. The method of claim 2 in which said resin has pore diameters in the range from about 10 to 100 Angstroms.

4. The method of claim 1 in which the pH of the water being treated is adjusted to a value of from 3.0 to 5.0 before contacting the same with said resin.

5. The method of claim 1 in which the pH of the water being treated is adjusted to a value of from 3.0 to 3.5.

6. The method of claim 1 in which the acidification of the resin consists in treating said resin with sulfuric acid.

7. The method of claim 1 in which the acidification of the resin consists in treating said resin with hydrochloric acid.

8. The method of claim 1 in which said resin is a polystyrene-divinyl benzene amine resin.

References Cited

UNITED STATES PATENTS 3,147,214   9/1964   Kressman et al. ____ 210—37 X
3,223,620   12/1965  Oberhofer _____ 210—37 X SAMIH N. ZAHARNA, *Primary Examiner.*

UNITED STATES PATENT OFFICE
CERTIFICATE OF CORRECTION

Patent No. 3,414,510                                December 3, 1968

Alfred W. Oberhofer

It is certified that error appears in the above identified patent and that said Letters Patent are hereby corrected as shown below:

Column 1, line 16, "microporous" should read -- macroporous --. Column 3, lines 11 to 20, the equations should appear as shown below:

Chromate removal

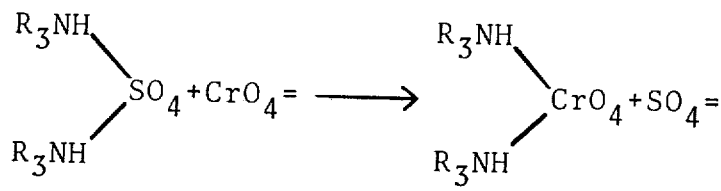

Regeneration with NaOH:

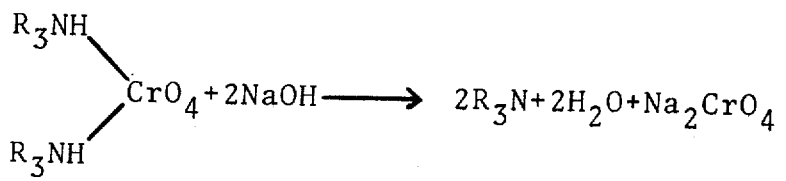

Signed and sealed this 1st day of September 1970.

(SEAL)
Attest:

EDWARD M. FLETCHER, JR.
Attesting Officer

WILLIAM E. SCHUYLER, JR.
Commissioner of Patents